United States Patent
Ryu et al.

(10) Patent No.: US 10,868,656 B1
(45) Date of Patent: Dec. 15, 2020

(54) CHANNEL STATE INFORMATION COMPUTATION DELAY DETERMINATION FOR LAYER 1 SIGNAL TO INTERFERENCE PLUS NOISE RATIO REPORTING

(71) Applicant: QUALCOMM Incorporated, San Diego, CA (US)

(72) Inventors: Jung Ho Ryu, Fort Lee, NJ (US); Yan Zhou, San Diego, CA (US); Kiran Venugopal, Raritan, NJ (US); Tianyang Bai, Bridgewater, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/805,465

(22) Filed: Feb. 28, 2020

Related U.S. Application Data
(60) Provisional application No. 62/925,579, filed on Oct. 24, 2019.

(51) Int. Cl.
*H04L 12/26* (2006.01)
*H04L 5/00* (2006.01)
*H04B 17/336* (2015.01)
*H04B 7/0417* (2017.01)
*H04B 7/06* (2006.01)

(52) U.S. Cl.
CPC ......... *H04L 5/0057* (2013.01); *H04B 7/0417* (2013.01); *H04B 7/0626* (2013.01); *H04B 17/336* (2015.01); *H04L 5/001* (2013.01)

(58) Field of Classification Search
None
See application file for complete search history.

(56) References Cited

U.S. PATENT DOCUMENTS

| | | | |
|---|---|---|---|
| 2018/0027442 A1* | 1/2018 | Han | H04L 1/1864 370/280 |
| 2018/0049047 A1* | 2/2018 | Lin | H04W 24/02 |
| 2019/0014568 A1* | 1/2019 | Nilsson | H04B 7/088 |
| 2019/0110254 A1* | 4/2019 | Yerramalli, Sr. | H04W 56/001 |
| 2019/0207662 A1* | 7/2019 | Zhou | H04W 72/042 |
| 2019/0297603 A1* | 9/2019 | Guo | H04L 5/0051 |
| 2019/0306924 A1* | 10/2019 | Zhang | H04W 72/046 |
| 2020/0045675 A1* | 2/2020 | Harrison | H04L 5/0057 |
| 2020/0100232 A1* | 3/2020 | Onggosanusi | H04W 72/14 |
| 2020/0228377 A1* | 7/2020 | Papasakellariou | H04L 5/0053 |
| 2020/0229013 A1* | 7/2020 | Kim | H04B 7/024 |
| 2020/0259528 A1* | 8/2020 | Zhang | H04L 5/0035 |

* cited by examiner

*Primary Examiner* — Phirin Sam
(74) *Attorney, Agent, or Firm* — Harrity & Harrity, LLP

(57) ABSTRACT

Various aspects of the present disclosure generally relate to wireless communication. In some aspects, a user equipment (UE) may receive a channel state information (CSI) reporting configuration for a CSI report, wherein the CSI reporting configuration indicates that the CSI report is to include a layer 1 signal to interference plus noise ratio (L1-SINR); and determine a CSI computation delay requirement for processing the CSI report that is to include the L1-SINR. Numerous other aspects are provided.

37 Claims, 5 Drawing Sheets

CHANNEL STATE INFORMATION COMPUTATION DELAY DETERMINATION FOR LAYER 1 SIGNAL TO INTERFERENCE PLUS NOISE RATIO REPORTING

CROSS-REFERENCE TO RELATED APPLICATION

This Patent Application claims priority to U.S. Provisional Patent Application No. 62/925,579, filed on Oct. 24, 2019, entitled "CHANNEL STATE INFORMATION COMPUTATION DELAY DETERMINATION FOR LAYER 1 SIGNAL TO INTERFERENCE PLUS NOISE RATIO REPORTING," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for channel state information computation delay determination for layer 1 signal to interference plus noise ratio reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a channel state information (CSI) reporting configuration for a CSI report, wherein the CSI reporting configuration indicates that the CSI report is to include a layer 1 signal to interference plus noise ratio (L1-SINR); and determining a CSI computation delay requirement for processing the CSI report that is to include the L1-SINR.

In some aspects, a UE for wireless communication may include memory and one or more processors operatively coupled to the memory. The memory and the one or more processors may be configured to receive a CSI reporting configuration for a CSI report, wherein the CSI reporting configuration indicates that the CSI report is to include an L1-SINR; and determine a CSI computation delay requirement for processing the CSI report that is to include the L1-SINR.

In some aspects, a non-transitory computer-readable medium may store one or more instructions for wireless communication. The one or more instructions, when executed by one or more processors of a UE, may cause the one or more processors to: receive a CSI reporting configuration for a CSI report, wherein the CSI reporting configuration indicates that the CSI report is to include an L1-SINR; and determine a CSI computation delay requirement for processing the CSI report that is to include the L1-SINR.

In some aspects, an apparatus for wireless communication may include means for receiving a CSI reporting configuration for a CSI report, wherein the CSI reporting configuration indicates that the CSI report is to include an L1-SINR; and means for determining a CSI computation delay requirement for processing the CSI report that is to include the L1-SINR.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
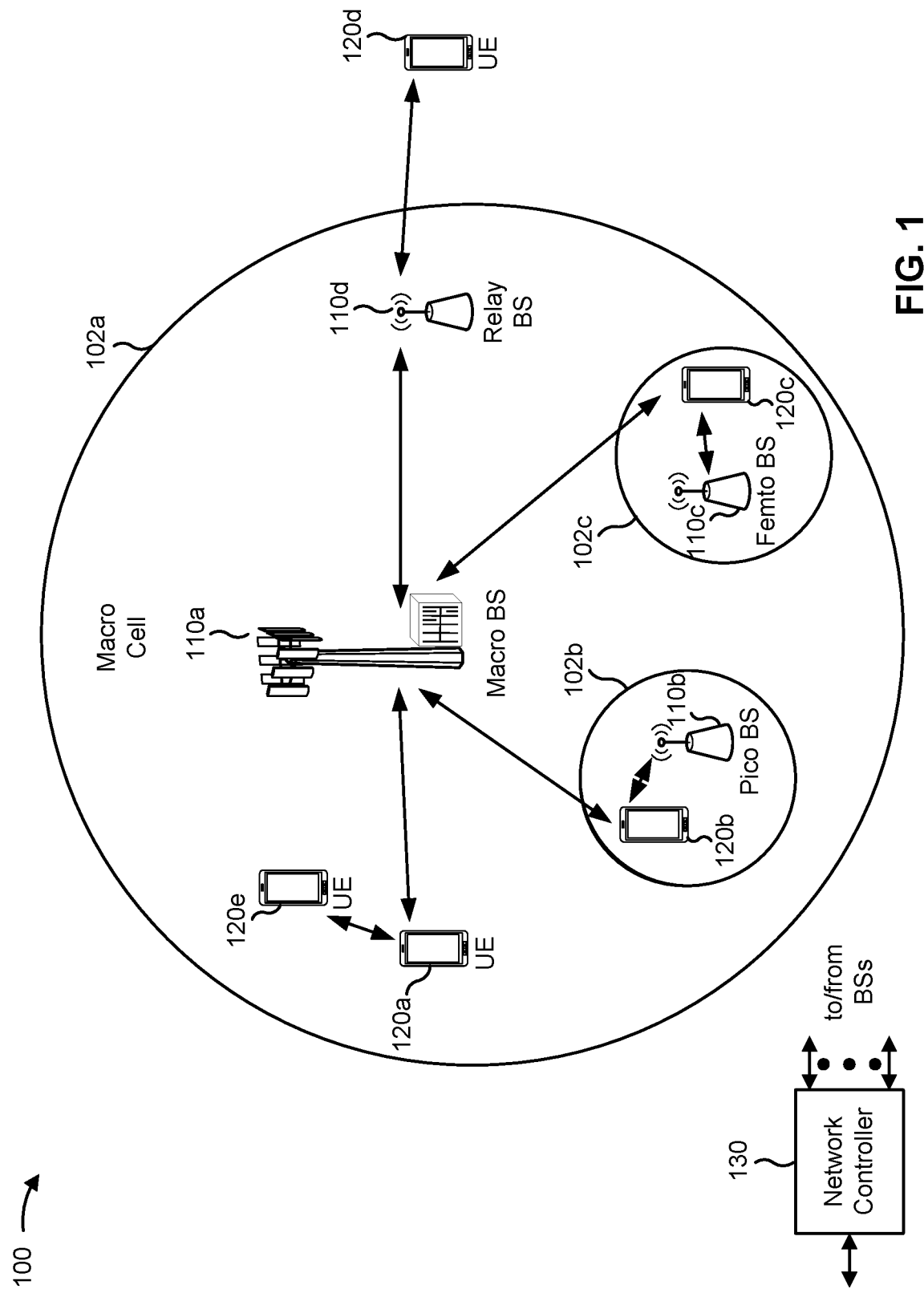
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
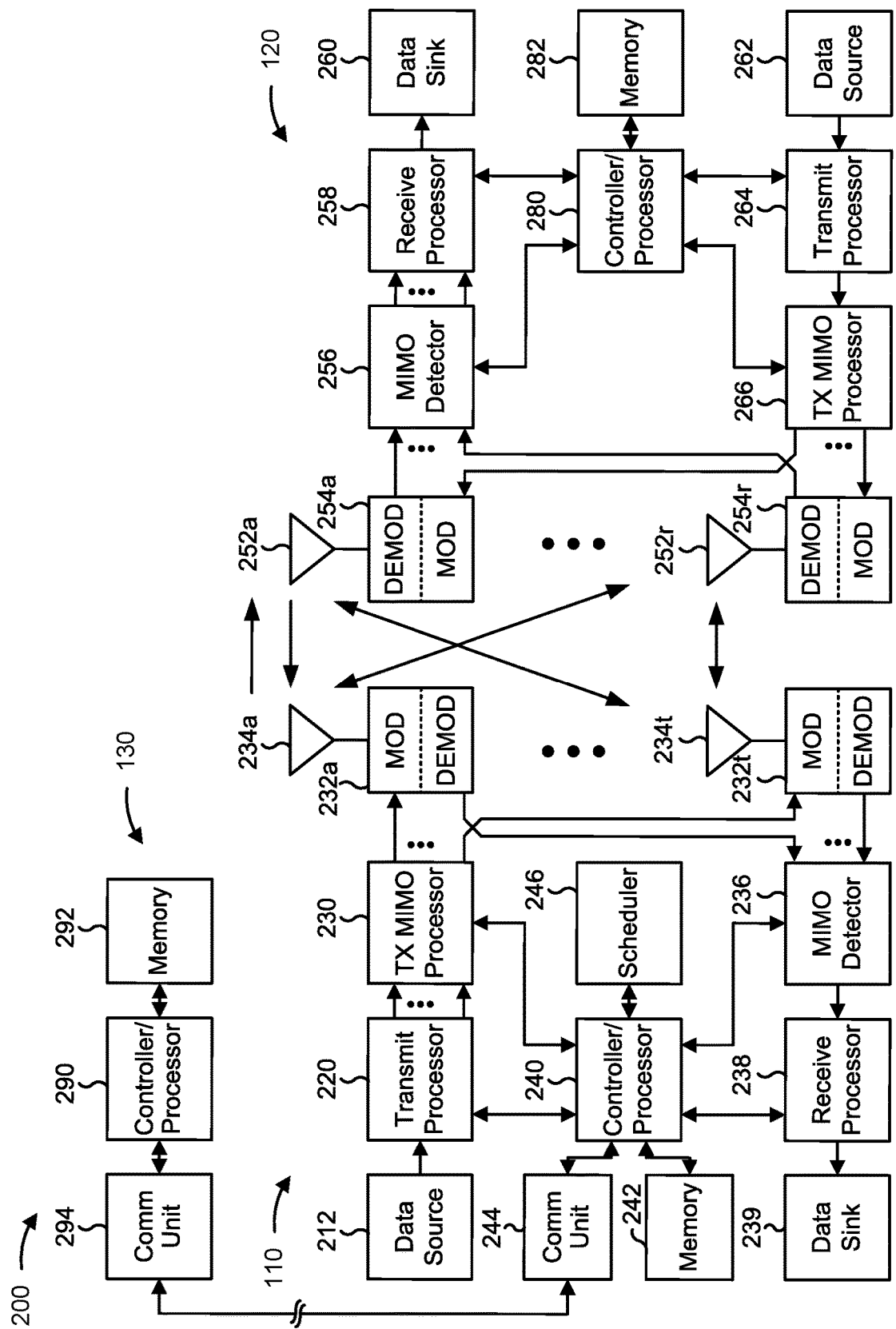
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel state information (CSI) computation delay determination for layer 1 signal to interference plus noise ratio (L1-SINR) reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5 and/or other processes as described herein. A scheduler 246 may schedule UEs for data transmission on the downlink and/or uplink.

In some aspects, UE 120 may include means for receiving a CSI reporting configuration for a CSI report, wherein the CSI reporting configuration indicates that the CSI report is to include an L1-SINR; means for determining a CSI computation delay requirement for processing the CSI report that is to include the L1-SINR; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
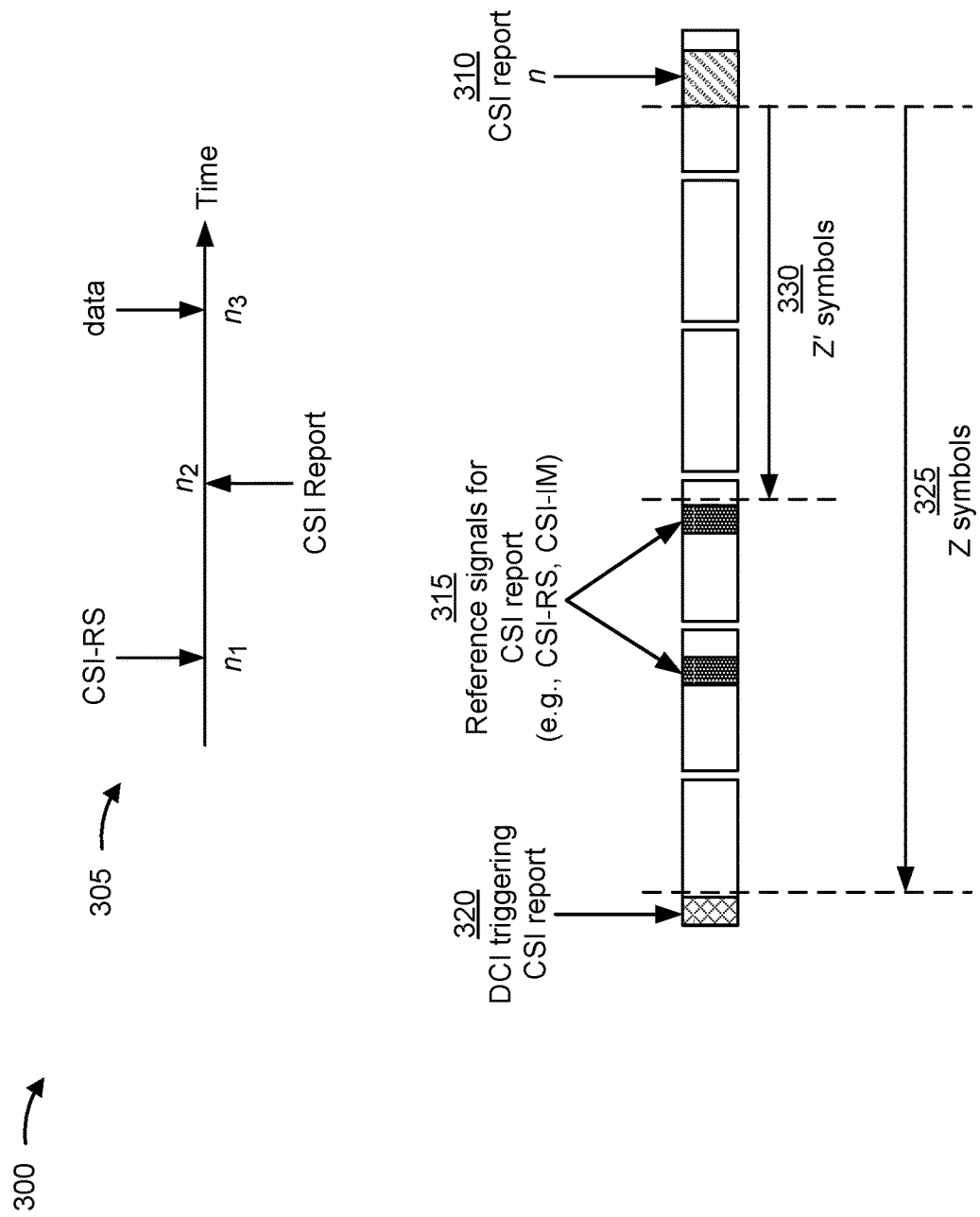
FIG. 3 is a diagram illustrating an example of channel state information reporting, in accordance with various aspects of the present disclosure.

FIG. 3 is a diagram illustrating an example of channel state information (CSI) reporting, in accordance with various aspects of the present disclosure.

As shown by reference number 305, a UE may measure one or more channel state information reference signals (CSI-RSs) (and/or other reference signals used for CSI reporting) transmitted by a base station at a first time $n_1$ (e.g., in a first slot). The UE may transmit a CSI report to the base station based at least in part on those measurements at a second time $n_2$ (e.g., in a second slot) after performing CSI processing of the one or more CSI-RSs. The base station may transmit data to the UE based at least in part on the CSI report at a third time $n_3$ (e.g., in a third slot). The base station may determine (e.g., select) transmission parameters for transmission of the data at time $n_3$ based at least in part on the CSI report. Such transmission parameters may include, for example, a modulation and coding scheme (MCS), a rank, a precoder, a beam, a multiple input multiple output (MIMO) layer, and/or the like. Additionally, or alternatively, the base station may determine scheduling information based at least in part on the CSI report, may perform beam management based at least in part on the CSI report, and/or the like.

As shown by reference number 310, a UE may transmit a CSI report in a CSI reporting slot n. The CSI report may be based at least in part one or more reference signals (e.g., in one or more CSI reference resources) that occur prior to transmission of the CSI report, as shown by reference number 315. A reference signal for a CSI report may include, for example, a CSI-RS, a CSI interference management (CSI-IM) reference signal, and/or the like. The CSI report may include one or more CSI parameters, such as a channel quality indicator (CQI) parameter, a precoding matrix indicator (PMI) parameter, a CSI-RS resource indicator (CRI) parameter, a strongest later indication (SLI) parameter, a rank indication (RI) parameter, a layer 1 (L1) reference signal received power (RSRP) (L1-RSRP) parameter, and/or the like.

As shown by reference number 320, in some aspects, the CSI report may be triggered by a physical downlink control channel (PDCCH) communication, such as downlink control information (DCI). In some aspects, the DCI may indicate one or more uplink resources for transmission of the CSI report. Additionally, or alternatively, the DCI may indicate one or more downlink resources for reference signals (e.g., CSI-RSs, CSI-IM reference signals, and/or the like) to be measured to calculate CSI for the CSI report. Additionally, or alternatively, the one or more uplink resources and/or the one or more downlink resources may be configured in a configuration message, such as a radio resource control (RRC) message (e.g., an RRC configuration message, an RRC reconfiguration message, and/or the like).

As shown by reference number 325, to allow the UE to have sufficient time to process the DCI prior to receiving the reference signals and/or transmitting the CSI report, the UE may determine a first CSI computation delay requirement, shown as Z. The parameter Z may indicate a number of required symbols between the last symbol (e.g., OFDM symbol) of the DCI and the first symbol of the CSI report. The UE may not be expected to measure a CSI-RS and/or update CSI if the last symbol of the DCI is received less than a threshold number of symbols (e.g., Z symbols) before a transmission time of the first symbol of the CSI report. In some aspects, the parameter $Z_{ref}$ may indicate a reference symbol for a CSI report with reference to the DCI. The parameter $Z_{ref}$ may be derived based at least in part on Z. For example, $Z_{ref}$ for a CSI report may be defined as the next uplink symbol with a cyclic prefix (CP) starting at $T_{proc,CSI}$ symbols after the end of the last symbol of the PDCCH triggering the CSI report, where:

$$T_{proc,CSI} = (Z)(2048+144) \times \kappa 2^{-\mu} \times T_C$$

In the above equation, $T_C$ and a are constant time units defined in section 4 of 3GPP technical specification (TS) 38.211.

As shown by reference number 330, to allow the UE to have sufficient time to process the reference signal(s) (e.g., to perform CSI calculations or CSI computations) prior to transmitting the CSI report, the UE may determine a second CSI computation delay requirement, shown as Z'. The parameter Z' may indicate a number of required symbols between the last symbol (e.g., OFDM symbol) of the CSI-RS (or another reference signal used to compute CSI) and the first symbol of the CSI report. The UE may not be expected to measure a CSI-RS if the last symbol of the CSI-RS is received less than a threshold number of symbols (e.g., Z' symbols) before a transmission time of the first symbol of the CSI report. In some aspects, the parameter $Z'_{ref}(n)$ may indicate a reference symbol for a CSI report (e.g., CSI report n) with reference to the CSI-RS. The parameter $Z'_{ref}(n)$ may be derived based at least in part on Z'. For example, $Z'_{ref}(n)$ for a CSI report n may be defined as the next uplink symbol with a CP starting at $T'_{proc,CSI}$ symbols after the end of the last symbol of the PDCCH triggering the CSI report, where:

$$T'_{proc,CSI} = (Z')(2048+144) \times \kappa 2^{-\mu} \times T_C$$

In NR, layer 1 signal to interference plus noise ratio (L1-SINR) has been added as a value that can be reported in a CSI report. Due to the nature of L1-SINR derivation and processing, several different CSI computation delay requirement values could be used for CSI reports that include an L1-SINR. For example, L1-SINR measurements are captured over a shorter duration of time than some other CSI parameters, such as CQI, PMI, CRI, SLI, RI, L1-RSRP, and/or the like. Consequently, L1-SINR may be useful in capturing instantaneous SINR measurements, unfiltered measurements, measurements that are not long enough for interfering base stations to cycle through many downlink beams, measurements where an interference term is not averaged over many transmit beams and/or receive beams, and/or the like. Some techniques and apparatuses described herein enable a UE to determine a CSI computation delay requirement to be used for CSI reports that include an L1-SINR.

As indicated above, FIG. 3 is provided as an example. Other examples may differ from what is described with regard to FIG. 3.

Figure 4:
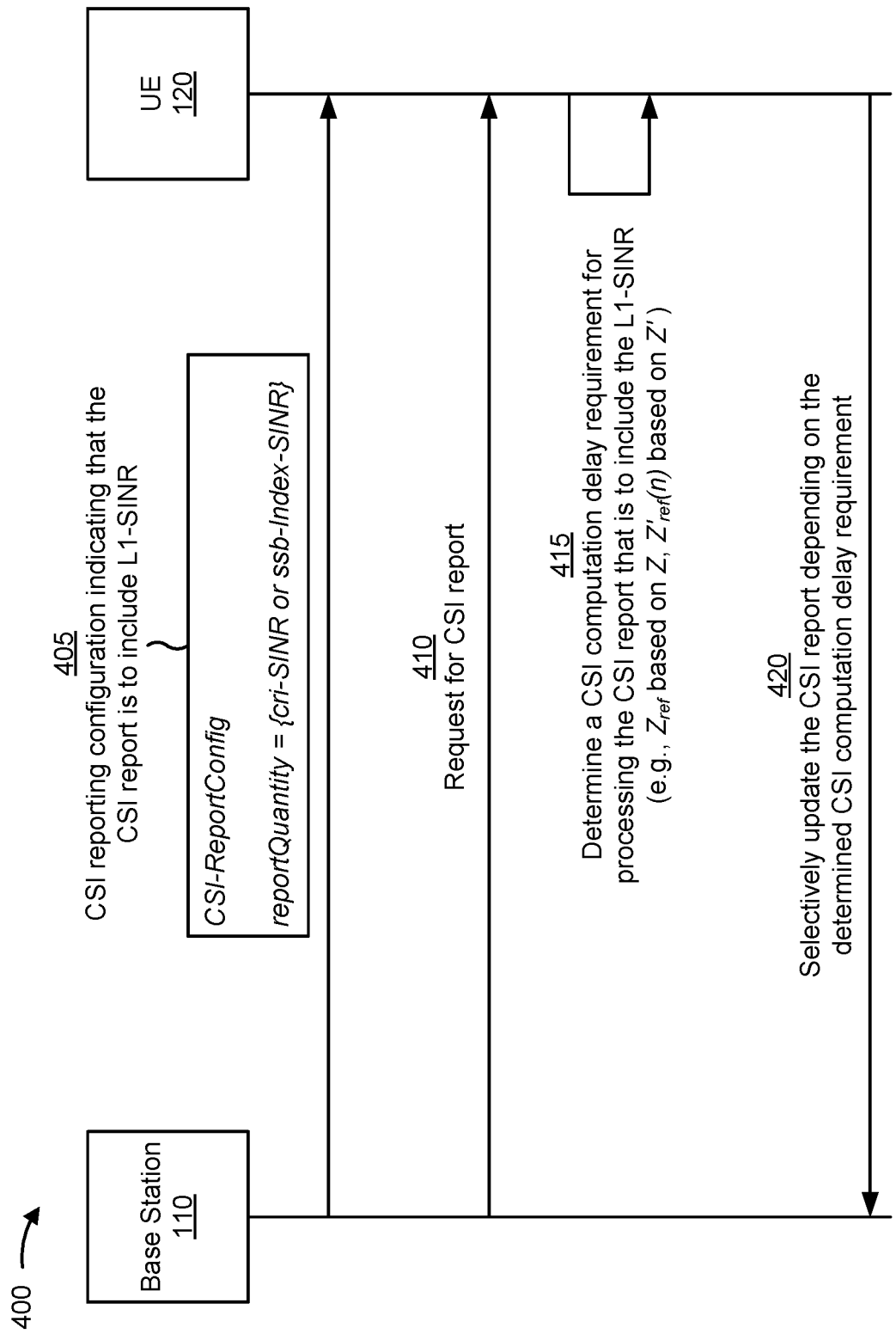
FIG. 4 is a diagram illustrating an example of channel state information computation delay determination for layer 1 signal to interference plus noise ratio reporting, in accordance with various aspects of the present disclosure.

FIG. 4 is a diagram illustrating an example of CSI computation delay determination for L1-SINR reporting, in accordance with various aspects of the present disclosure. As shown in FIG. 4, a base station 110 and a UE 120 may communicate with one another.

As shown by reference number 405, the base station 110 may transmit, to the UE 120, a CSI reporting configuration for a CSI report. The CSI reporting configuration may indicate that the CSI report is to include an L1-SINR. In some aspects, the CSI reporting configuration may be included in an RRC message, such as an RRC configuration message, an RRC reconfiguration message, and/or the like. In some aspects, a CSI reporting configuration (CSI-ReportConfig) for a CSI report may include a report quantity (reportQuantity) information element that indicates the quantities or parameters that are to be reported in the CSI report. In some aspects, the report quantity IE may indicate that an L1-SINR parameter is to be included in the CSI report, such as by including a value of 'cri-SINR', 'ssb-Index-SINR', and/or the like. Additionally, or alternatively, the report quantity IE may indicate one or more other parameters that are to be reported in the CSI report (e.g., the same CSI report as the L1-SINR), such as a CQI parameter, a PMI parameter, a CRI parameter, an SLI parameter, an RI parameter, an L1-RSRP parameter, and/or the like. For example, the report quantity IE may include a value of 'cri-RI-PMI-CQI', 'cri-RI-i1', 'cri-RI-i1-CQI', 'cri-RI-CQI', 'cri-RSRP', 'ssb-Index-RSRP', 'cri-RI-LI-PMI-CQI', and/or the like.

As shown by reference number 410, the base station 110 may transmit, to the UE 120, a request for a CSI report (sometimes referred to as a CSI request). In some aspects, the request is a request for a periodic CSI report. In this case, the base station 110 may indicate a periodicity and/or a set of uplink resources for transmission of the CSI report, a periodicity and/or a set of downlink resources for reference signals (e.g., CSI-RSs, synchronization signal blocks (SSBs), and/or the like) to be measured by the UE 120 for the CSI report, and/or the like. In some aspects, the request is a request for aperiodic CSI. In this case, the base station 110 may indicate a set of uplink resources for transmission of the CSI report, a set of downlink resources for reference signals (e.g., CSI-RSs, SSBs, and/or the like) to be measured by the UE 120 for the CSI report, and/or the like. In some aspects, the request may be included in an RRC message, such as the same RRC message that includes the CSI reporting configuration. Additionally, or alternatively, the request may be included in DCI, a medium access control (MAC) control element (CE), and/or the like.

As shown by reference number 415, the UE 120 may determine a CSI computation delay requirement for processing the CSI report that is to include the L1-SINR. In some aspects, the CSI computation delay requirement for processing the CSI report that is to include the L1-SINR may be pre-specified according to a wireless communication standard. Additionally, or alternatively, the UE 120 may determine the CSI computation delay requirement for processing the CSI report that is to include the L1-SINR based at least in part on a rule. The rule may be pre-specified according to a wireless communication standard and/or may signaled to the UE 120 in a configuration message. Additionally, or alternatively, the UE 120 may determine the CSI computation delay requirement for processing the CSI report that is to include the L1-SINR based at least in part on receiving the request for the CSI report.

In some aspects, the UE 120 may determine the CSI computation delay requirement for processing the CSI report that is to include the L1-SINR based at least in part on a table that indicates associations between a set of sub-carrier spacings (represented by mu ($\mu$) and a corresponding set of CSI computation delay requirement parameters (represented by Z and/or Z'). In some aspects, the table may be pre-specified according to a wireless communication standard, may be signaled to the UE 120 in a configuration message, may be stored in memory of the UE 120, and/or the like. Example tables (Table 1 and Table 2) are provided below.

TABLE 1

| | $Z_1$ [symbols] | |
|---|---|---|
| $\mu$ | $Z_1$ | $Z'_1$ |
| 0 | 10 | 8 |
| 1 | 13 | 11 |
| 2 | 25 | 21 |
| 3 | 43 | 36 |

TABLE 2

| μ | $Z_1$ | $Z'_1$ | $Z_2$ | $Z'_2$ | $Z_3$ | $Z'_3$ |
|---|---|---|---|---|---|---|
| | $Z_1$ [symbols] | | $Z_2$ [symbols] | | $Z_3$ [symbols] | |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

In some aspects, the UE 120 may determine the CSI computation delay requirement for processing the CSI report that is to include the L1-SINR based at least in part on a first set of CSI computation delay requirement parameters, such as $Z_1$ and $Z'_1$ of Table 1. In some aspects, the first set of CSI computation delay requirement parameters is a same set of CSI computation delay requirement parameters (e.g., $Z_1$ and $Z'_1$ of Table 1) used when a first condition is satisfied. In some aspects, the first condition is that CSI is aperiodically triggered without transmitting a physical uplink shared channel (PUSCH) that includes at least one of a transport block (TB) or hybrid automatic repeat request acknowledgement (HARQ-ACK) feedback (e.g., that includes a TB, HARQ-ACK feedback, or both) when no CSI processing units (CPUs) are occupied (e.g., L=0 CPUs are occupied) and the CSI to be transmitted is a single CSI and corresponds to wideband frequency-granularity, where the CSI corresponds to at most four CSI-RS ports in a single resource without a CSI-RS resource indicator (CRI) report, and where a codebook type (e.g., a codebookType field) is set to 'typeI-SinglePanel' or where a report quantity is set to 'cri-RI-CQI'.

In some aspects, the UE 120 may determine the CSI computation delay requirement for processing the CSI report that is to include the L1-SINR based at least in part on a second set of CSI computation delay requirement parameters, such as $Z_1$ and $Z'_1$ of Table 2. In some aspects, the second set of CSI computation delay requirement parameters is a same set of CSI computation delay requirement parameters (e.g., $Z_1$ and $Z'_1$ of Table 2) used when a second condition is satisfied. In some aspects, the second condition is that CSI to be transmitted corresponds to wideband frequency-granularity where the CSI corresponds to at most four CSI-RS ports in a single resource without a CRI report, and where a codebook type is set to 'typeI-SinglePanel' or where a report quantity is set to 'cri-RI-CQI'.

In some aspects, the UE 120 may determine the CSI computation delay requirement for processing the CSI report that is to include the L1-SINR based at least in part on a third set of CSI computation delay requirement parameters, such as $Z_3$ and $Z'_3$ of Table 2. In some aspects, the third set of CSI computation delay requirement parameters is a same set of CSI computation delay requirement parameters (e.g., $Z_3$ and $Z'_3$ of Table 2) used when a third condition is satisfied. In some aspects, the third condition is that a report quantity is set to 'cri-RSRP' or 'ssb-Index-RSRP'. In some aspects, the third set of CSI computation parameters are based at least in part on a UE beam report timing capability (e.g., beamReportTiming, sometimes represented by $X\mu$) and a UE beam switch timing capability (e.g., beamSwitchTiming, sometimes represented by $KB_1$).

In some aspects, the UE 120 may determine the CSI computation delay requirement for processing the CSI report that is to include the L1-SINR based at least in part on a fourth set of CSI computation delay requirement parameters, such as $Z_2$ and $Z'_2$ of Table 2. In some aspects, the fourth set of CSI computation delay requirement parameters is a same set of CSI computation delay requirement parameters (e.g., $Z_2$ and $Z'_2$ of Table 2) used when the first condition associated with using the first set of CSI computation delay requirement parameters is not satisfied, the second condition associated with using the second set of CSI computation delay requirement parameters is not satisfied, and the third condition associated with using the third set of CSI computation delay requirement parameters is not satisfied. The first condition, the second condition, and the third condition are described in more detail above.

In some aspects, the UE 120 may determine the CSI computation delay requirement for processing the CSI report that is to include the L1-SINR based at least in part on a fifth set of CSI computation delay requirement parameters. The fifth set may be different from the first set, the second set, the third set, and the fourth set, described above. For example, the fifth set of CSI computation delay parameters may be a set of CSI computation delay requirement parameters other than $Z_1$ and $Z'_1$ of Table 1, Z, and Z' of Table 2, $Z_3$ and $Z'_3$ of Table 2, and $Z_2$ and $Z'_2$ of Table 2.

In some aspects, the UE 120 may determine the CSI computation delay requirement for processing the CSI report that is to include the L1-SINR based at least in part on an L1-SINR measurement resource configuration. In some aspects, the L1-SINR measurement resource configuration may be indicated in a configuration message, such as an RRC message. Additionally, or alternatively, the L1-SINR measurement resource configuration may be indicated in a request that schedules the CSI report. The L1-SINR measurement resource configuration may indicate whether L1-SINR is to be measured on channel measurement resources (CMRs), whether L1-SINR is to be measured on interference measurement resources (IMRs) (e.g., whether dedicated IMRs are configured for L1-SINR measurements), whether CSI-RSs are to be used for the CMRs (e.g., whether CSI-RS-based CMR is to be used, such as with a density of 3 resource elements (REs) per resource block (RB)), whether SSBs are to be used for the CMRs (e.g., whether SSB-based CMR is to be used), whether zero power (ZP) IMRs are to be used, whether non-zero power (NZP) IMRs are to be used (e.g., with a density of 3 REs per RB), and/or the like.

In some aspects, the L1-SINR measurement resource configuration indicates that L1-SINR is to be measured on only CMRs and not on IMRs (e.g., that dedicated IMRs are not configured for L1-SINR measurements). In some aspects (e.g., if the L1-SINR measurement resource configuration indicates that L1-SINR is to be measured on only CMRs and not on IMRs), the L1-SINR measurement resource configuration may indicate CSI-RSs for the CMRs (e.g., may indicate CSI-RS-based CMRs). In some aspects, CSI-RS-based CMRs may have a density of 3 REs per RB.

In some aspects, the L1-SINR measurement resource configuration indicates that L1-SINR is to be measured on both CMRs and on IMRs (e.g., that dedicated IMRs are configured for L1-SINR measurements). For example, in some aspects, the L1-SINR measurement resource configuration may indicate SSBs for the CMRs (e.g., SSB-based CMRs) and may indicate ZP IMRs. In some aspects, the L1-SINR measurement resource configuration may indicate CSI-RSs for the CMRs (e.g., CSI-RS-based CMRs) and may indicate ZP IMRs. In some aspects, the L1-SINR measurement resource configuration may indicate SSBs for the CMRs (e.g., SSB-based CMRs) and may indicate NZP IMRs (e.g., with a density of 3 REs per RB). In some aspects, the L1-SINR measurement resource configuration may indicate CSI-RSs for the CMRs (e.g., CSI-RS-based CMRs) and may indicate NZP IMRs (e.g., with a density of 3 REs per RB). In some aspects, the L1-SINR measurement resource configuration may indicate SSBs for the CMRs (e.g., SSB-based CMRs) and may indicate both ZP and NZP IMRs. In some aspects, the L1-SINR measurement resource configuration may indicate CSI-RSs for the CMRs (e.g., CSI-RS-based CMRs) and may indicate both ZP and NZP IMRs.

In some aspects, for a given L1-SINR measurement resource configuration, the UE 120 may determine the CSI computation delay requirement for processing the CSI report that is to include the L1-SINR. For a given L1-SINR measurement resource configuration, the UE 120 may determine the CSI computation delay requirement using the first set of CSI computation delay requirement parameters, the second set of CSI computation delay requirement parameters, the third set of CSI computation delay requirement parameters, the fourth set of CSI computation delay requirement parameters, or the fifth set of CSI computation delay requirement parameters, as described above. In some aspects, different L1-SINR measurement resource configurations may be associated with different CSI computation delay requirements for processing the CSI report that is to include the L1-SINR. In some aspects, the CSI computation delay requirement for an L1-SINR measurement resource configuration may be pre-specified according to a wireless communication standard.

As shown by reference number 420, the UE 120 may selectively update the CSI report based at least in part on the CSI computation delay requirement for processing the CSI report that is to include the L1-SINR. For example, if the UE 120 has sufficient CSI processing time to satisfy the CSI computation delay requirement for the CSI report, then the UE 120 may update CSI for the CSI report, such as by performing CSI calculations or computations. In this case, the UE 120 may include the updated CSI in the CSI report, and may transmit the CSI report to the base station 110. If the UE 120 does not have sufficient CSI processing time to satisfy the CSI computation delay requirement for the CSI report, then the UE 120 may not update CSI for the CSI report, such as by refraining from performing CSI calculations or computations. In this case, in some aspects, the UE 120 may include previously-determined CSI in the CSI report (e.g., previously-determined CSI that was transmitted in a previous CSI report), and may transmit the CSI report to the base station 110. Alternatively, the UE 120 may drop the CSI report. In this way, the UE 120 may appropriately determine a CSI computation delay requirement to be used for CSI reports that include an L1-SINR, and may selectively update CSI reports accordingly.

As indicated above, FIG. 4 is provided as an example. Other examples may differ from what is described with regard to FIG. 4.

Figure 5:
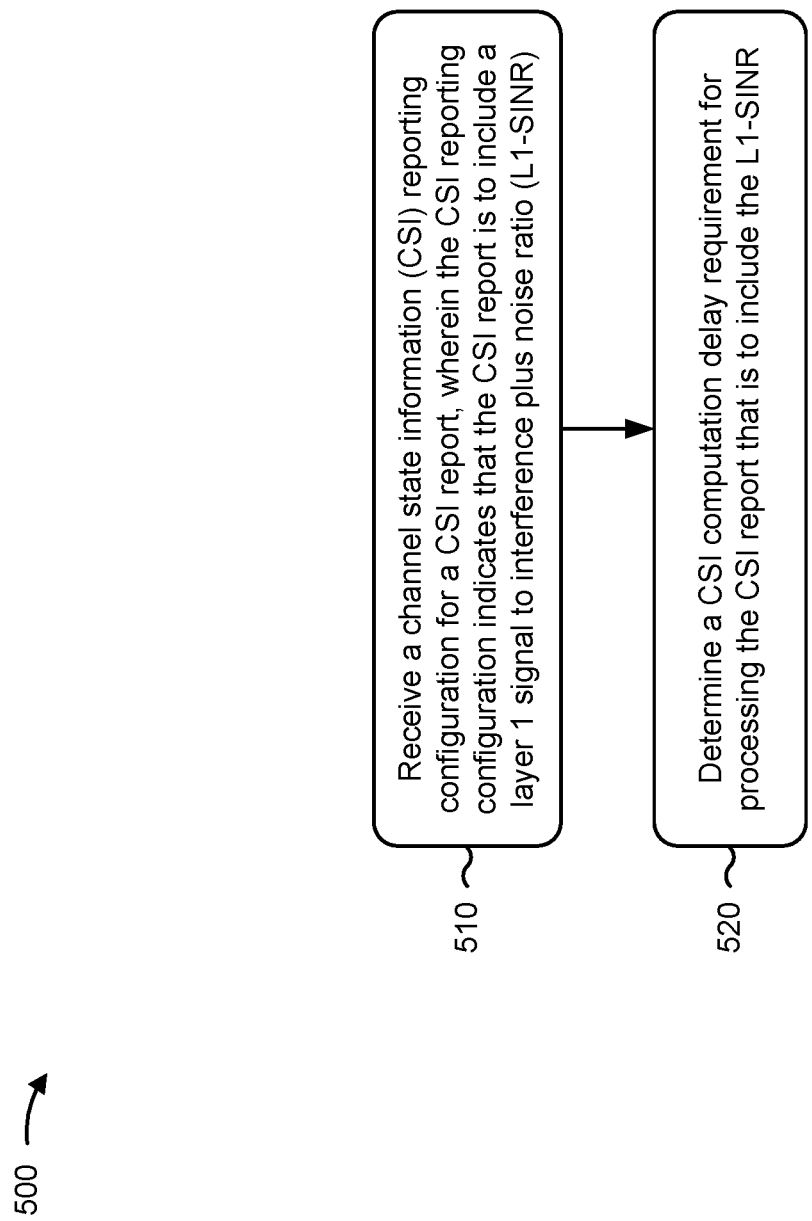
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with CSI computation delay determination for L1-SINR reporting.

As shown in FIG. 5, in some aspects, process 500 may include receiving a CSI reporting configuration for a CSI report, wherein the CSI reporting configuration indicates that the CSI report is to include an L1-SINR (block 510). For example, the UE (e.g., using receive processor 258, controller/processor 280, memory 282, and/or the like) may receive a CSI reporting configuration for a CSI report, as described above. In some aspects, the CSI reporting configuration indicates that the CSI report is to include an L1-SINR.

As further shown in FIG. 5, in some aspects, process 500 may include determining a CSI computation delay requirement for processing the CSI report that is to include the L1-SINR (block 520). For example, the UE (e.g., using receive processor 258, transmit processor 264, controller/processor 280, memory 282, and/or the like) may determine a CSI computation delay requirement for processing the CSI report that is to include the L1-SINR, as described above.

Process 500 may include additional aspects, such as any single aspect or any combination of aspects described below and/or in connection with one or more other processes described elsewhere herein.

In a first aspect, the CSI computation delay requirement for processing the CSI report that is to include the L1-SINR is determined based at least in part on a table that indicates associations between a set of sub-carrier spacings and a corresponding set of CSI computation delay requirement parameters.

In a second aspect, alone or in combination with the first aspect, the CSI computation delay requirement for processing the CSI report that is to include the L1-SINR is determined based at least in part on a first set of CSI computation delay requirement parameters, a second set of CSI computation delay requirement parameters, a third set of CSI computation delay requirement parameters, a fourth set of CSI computation delay requirement parameters, or a fifth set of CSI computation delay requirement parameters.

In a third aspect, alone or in combination with one or more of the first and second aspects, the first set of CSI computation delay requirement parameters is a same set of CSI computation delay requirement parameters used when CSI is aperiodically triggered without transmitting a PUSCH that includes at least one of a TB or HARQ-ACK feedback when no CSI processing units are occupied and the CSI to be transmitted is a single CSI and corresponds to wideband frequency granularity, where the CSI corresponds to at most four CSI-RS ports in a single resource without a CRI report, and where a codebook type is set to 'typeI-SinglePanel' or where a report quantity is set to 'cri-RI-CQI'.

In a fourth aspect, alone or in combination with one or more of the first through third aspects, the second set of CSI computation delay requirement parameters is a same set of CSI computation delay requirement parameters used when CSI to be transmitted corresponds to wideband frequency-granularity, where the CSI corresponds to at most four CSI-RS ports in a single resource without a CRI report, and where a codebook type is set to 'typeI-SinglePanel' or where a report quantity is set to 'cri-RI-CQI'.

In a fifth aspect, alone or in combination with one or more of the first through fourth aspects, the third set of CSI computation delay requirement parameters is a same set of CSI computation delay requirement parameters used when a report quantity is set to 'cri-RSRP' or 'ssb-Index-RSRP'.

In a sixth aspect, alone or in combination with one or more of the first through fifth aspects, the third set of CSI computation parameters are based at least in part on a UE beam report timing capability and a UE beam switch timing capability.

In a seventh aspect, alone or in combination with one or more of the first through sixth aspects, the fourth set of CSI computation delay requirement parameters is a same set of CSI computation delay requirement parameters used when a first condition associated with using the first set of CSI computation delay requirement parameters is not satisfied, a second condition associated with using the second set of CSI computation delay requirement parameters is not satisfied, and a third condition associated with using the third set of CSI computation delay requirement parameters is not satisfied.

In an eighth aspect, alone or in combination with one or more of the first through seventh aspects, the fifth set of CSI computation delay requirement parameters is different from the first set, the second set, the third set, and the fourth set.

In a ninth aspect, alone or in combination with one or more of the first through eighth aspects, the CSI computation delay requirement for processing the CSI report that is to include the L1-SINR is based at least in part on an L1-SINR measurement resource configuration.

In a tenth aspect, alone or in combination with one or more of the first through ninth aspects, the L1-SINR measurement resource configuration indicates that L1-SINR is to be measured on only CMRs and not on IMRs.

In an eleventh aspect, alone or in combination with one or more of the first through tenth aspects, the L1-SINR measurement resource configuration indicates CSI-RSs for the CMRs.

In a twelfth aspect, alone or in combination with one or more of the first through eleventh aspects, the L1-SINR measurement resource configuration indicates that L1-SINR is to be measured on both CMRs and on IMRs.

In a thirteenth aspect, alone or in combination with one or more of the first through twelfth aspects, the L1-SINR measurement resource configuration indicates one of: SSBs for the CMRs, and zero power IMRs; CSI-RSs for the CMRs, and zero power IMRs; SSBs for the CMRs, and non-zero power IMRs; CSI-RSs for the CMRs, and non-zero power IMRs; SSBs for the CMRs, and both zero power and non-zero power IMRs; or CSI-RSs for the CMRs, and both zero power and non-zero power IMRs.

In a fourteenth aspect, alone or in combination with one or more of the first through thirteenth aspects, the CSI computation delay requirement for processing the CSI report that is to include the L1-SINR is determined for the L1-SINR measurement resource configuration based at least in part on a first set of CSI computation delay requirement parameters, a second set of CSI computation delay requirement parameters, a third set of CSI computation delay requirement parameters, a fourth set of CSI computation delay requirement parameters, or a fifth set of CSI computation delay requirement parameters.

In a fifteenth aspect, alone or in combination with one or more of the first through fourteenth aspects, process 500 includes selectively updating the CSI report based at least in part on the CSI computation delay requirement for processing the CSI report that is to include the L1-SINR.

In a sixteenth aspect, alone or in combination with one or more of the first through fifteenth aspects, the CSI computation delay requirement for processing the CSI report that is to include the L1-SINR is determined based at least in part on receiving a request for the CSI report.

In a seventeenth aspect, alone or in combination with one or more of the first through sixteenth aspects, the CSI reporting configuration indicates that the CSI report is to include the L1-SINR by including, in the CSI reporting configuration, a report quantity information element that includes a value of 'ssb-Index-SINR' or 'cri-SINR.'

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a channel state information (CSI) reporting configuration for a CSI report, wherein the CSI reporting configuration indicates that the CSI report is to include a layer 1 signal to interference plus noise ratio (L1-SINR); and
    determining a CSI computation delay requirement for processing the CSI report that is to include the L1-SINR, wherein the CSI computation delay requirement for processing the CSI report that is to include the L1-SINR is determined based at least in part on a first set of CSI computation delay requirement parameters, a second set of CSI computation delay requirement parameters, a third set of CSI computation delay requirement parameters, or a fourth set of CSI computation delay requirement parameters.

2. The method of claim 1, wherein the CSI reporting configuration indicates that the CSI report is to include the L1-SINR by including, in the CSI reporting configuration, a report quantity information element that includes a value of 'ssb-Index-SINR' or 'cri-SINR'.

3. The method of claim 1, wherein the CSI computation delay requirement for processing the CSI report that is to include the L1-SINR is determined based at least in part on a table that indicates associations between a set of sub-carrier spacings and a corresponding set of CSI computation delay requirement parameters.

4. The method of claim 1, wherein the first set of CSI computation delay requirement parameters is a same set of CSI computation delay requirement parameters used when CSI is a periodically triggered without transmitting a physical uplink shared channel (PUSCH) that includes at least one of a transport block (TB) or hybrid automatic repeat request acknowledgement (HARQ-ACK) feedback when no CSI processing units are occupied and the CSI to be transmitted is a single CSI and corresponds to wideband frequency granularity where the CSI corresponds to at most four channel state information reference signal (CSI-RS) ports in a single resource without a CSI-RS resource indicator (CRI) report, and where a codebook type is set to 'typeI-SinglePanel' or where a report quantity is set to 'cri-RI-CQI'.

5. The method of claim 1, wherein the second set of CSI computation delay requirement parameters is a same set of CSI computation delay requirement parameters used when CSI to be transmitted corresponds to wideband frequency-granularity where the CSI corresponds to at most four channel state information reference signal (CSI-RS) ports in a single resource without a CSI-RS resource indicator (CRI) report, and where a codebook type is set to 'typeI-SinglePanel' or where a report quantity is set to 'cri-RI-CQI'.

6. The method of claim 1, wherein the third set of CSI computation delay requirement parameters is a same set of CSI computation delay requirement parameters used when a report quantity is set to 'cri-RSRP' or 'ssb-Index-RSRP'.

7. The method of claim 1, wherein the third set of CSI computation delay requirement parameters are based at least in part on a UE beam report timing capability and a UE beam switch timing capability.

8. The method of claim 1, wherein the fourth set of CSI computation delay requirement parameters is a same set of CSI computation delay requirement parameters used when a first condition associated with using the first set of CSI computation delay requirement parameters is not satisfied, a second condition associated with using the second set of CSI computation delay requirement parameters is not satisfied, and a third condition associated with using the third set of CSI computation delay requirement parameters is not satisfied.

9. The method of claim 1, wherein the CSI computation delay requirement for processing the CSI report that is to include the L1-SINR is further determined based at least in part on a fifth set of CSI computation delay requirement parameters that is different from the first set, the second set, the third set, and the fourth set.

10. The method of claim 1, wherein the CSI computation delay requirement for processing the CSI report that is to include the L1-SINR is based at least in part on an L1-SINR measurement resource configuration.

11. The method of claim 10, wherein the L1-SINR measurement resource configuration indicates that L1-SINR is to be measured on only channel measurement resources (CMRs) and not on interference measurement resources (IMRs).

12. The method of claim 11, wherein the L1-SINR measurement resource configuration indicates CSI reference signals (CSI-RSs) for the CMRs.

13. The method of claim 10, wherein the L1-SINR measurement resource configuration indicates that L1-SINR is to be measured on both channel measurement resources (CMRs) and on interference measurement resources (IMRs).

14. The method of claim 13, wherein the L1-SINR measurement resource configuration indicates one of:
synchronization signal blocks (SSBs) for the CMRs, and zero power IMRs;
CSI reference signals (CSI-RSs) for the CMRs, and zero power IMRs;
SSBs for the CMRs, and non-zero power IMRs;
CSI-RSs for the CMRs, and non-zero power IMRs;
SSBs for the CMRs, and both zero power and non-zero power IMRs; or
CSI-RSs for the CMRs, and both zero power and non-zero power IMRs.

15. The method of claim 10, wherein the CSI computation delay requirement for processing the CSI report that is to include the L1-SINR is determined for the L1-SINR measurement resource configuration based at least in part on the first set of CSI computation delay requirement parameters, the second set of CSI computation delay requirement parameters, the third set of CSI computation delay requirement parameters, the fourth set of CSI computation delay requirement parameters, or a fifth set of CSI computation delay requirement parameters.

16. The method of claim 1, further comprising selectively updating the CSI report based at least in part on the CSI computation delay requirement for processing the CSI report that is to include the L1-SINR.

17. The method of claim 1, wherein the CSI computation delay requirement for processing the CSI report that is to include the L1-SINR is determined based at least in part on receiving a request for the CSI report.

18. The method of claim 1, wherein the first set of CSI computation delay requirement parameters include parameters $Z_1$ and $Z'_1$ with the following values:
$Z_1=10$ and $Z'_1=8$ when sub-carrier spacing $\mu=0$;
$Z_1=13$ and $Z'_1=11$ when sub-carrier spacing $\mu=1$;
$Z_1=25$ and $Z'_1=21$ when sub-carrier spacing $\mu=2$; and
$Z_1=43$ and $Z'_1=36$ when sub-carrier spacing $\mu=3$.

19. The method of claim 1, wherein the second set of CSI computation delay requirement parameters include parameters $Z_1$ and $Z'_1$ with the following values:
$Z_1=22$ and $Z'_1=16$ when sub-carrier spacing $\mu=0$;
$Z_1=33$ and $Z'_1=30$ when sub-carrier spacing $\mu=1$;
$Z_1=44$ and $Z'_1=42$ when sub-carrier spacing $\mu=2$; and
$Z_1=97$ and $Z'_1=85$ when sub-carrier spacing $\mu=3$.

20. The method of claim 1, wherein the third set of CSI computation delay requirement parameters include parameters $Z_3$ and $Z'_3$ with the following values:
$Z_3=22$ and $Z'_3=X_1$ when sub-carrier spacing $\mu=0$;
$Z_3=33$ and $Z'_3=X_2$ when sub-carrier spacing $\mu=1$;
$Z_3=\min(44, X_3+KB_1)$ and $Z'_3=X_3$ when sub-carrier spacing $\mu=2$; and $Z_3=\min(97, X_4+KB_2)$ and $Z'_3=X_4$ when sub-carrier spacing $\mu=3$, wherein a UE beam report timing capability is represented by $X\mu$ and a UE beam switch timing capability is represented by KB.

21. The method of claim 1, wherein the fourth set of CSI computation delay requirement parameters include parameters $Z_2$ and $Z'_2$ with the following values:

$Z_2=40$ and $Z'_2=37$ when sub-carrier spacing $\mu=0$;
$Z_2=72$ and $Z'_2=69$ when sub-carrier spacing $\mu=1$;
$Z_2=141$ and $Z'_2=140$ when sub-carrier spacing $\mu=2$; and
$Z_2=152$ and $Z'_2=140$ when sub-carrier spacing $\mu=3$.

22. A user equipment (UE) for wireless communication, comprising:
a memory; and
one or more processors operatively coupled to the memory, the memory and the one or more processors configured to:
receive a channel state information (CSI) reporting configuration for a CSI report, wherein the CSI reporting configuration indicates that the CSI report is to include a layer 1 signal to interference plus noise ratio (L1-SINR); and
determine a CSI computation delay requirement for processing the CSI report that is to include the L1-SINR, wherein the CSI computation delay requirement for processing the CSI report that is to include the L1-SINR is determined based at least in part on a first set of CSI computation delay requirement parameters, a second set of CSI computation delay requirement parameters, a third set of CSI computation delay requirement parameters, or a fourth set of CSI computation delay requirement parameters.

23. The UE of claim 22, wherein the CSI reporting configuration indicates that the CSI report is to include the L1-SINR by including, in the CSI reporting configuration, a report quantity information element that includes a value of 'ssb-Index-SINR' or 'cri-SINR'.

24. The UE of claim 22, wherein the CSI computation delay requirement for processing the CSI report that is to include the L1-SINR is determined based at least in part on a table that indicates associations between a set of sub-carrier spacings and a corresponding set of CSI computation delay requirement parameters.

25. The UE of claim 22, wherein the first set of CSI computation delay requirement parameters is a set of CSI computation delay requirement parameters used when CSI to be transmitted corresponds to wideband frequency-granularity where the CSI corresponds to at most four channel state information reference signal (CSI-RS) ports in a single resource without a CSI-RS resource indicator (CRI) report, and where a codebook type is set to 'typeI-SinglePanel' or where a report quantity is set to 'cri-RI-CQI';
wherein the second set of CSI computation delay requirement parameters is a set of CSI computation delay requirement parameters used when a report quantity is set to 'cri-RSRP' or 'ssb-Index-RSRP';
wherein the third set of CSI computation delay requirement parameters is a set of CSI computation delay requirement parameters used when a first condition associated with using the first set of CSI computation delay requirement parameters is not satisfied and when a second condition associated with using the second set of CSI computation delay requirement parameters is not satisfied; and wherein the fourth set of CSI computation delay requirement parameters is a set of CSI computation delay requirement parameters used when the first condition associated with using the first set of CSI computation delay requirement parameters is not satisfied, the second condition associated with using the second set of CSI computation delay requirement parameters is not satisfied, and a third condition associated with using the third set of CSI computation delay requirement parameters is not satisfied.

26. The UE of claim 22, wherein the first set of CSI computation delay requirement parameters include parameters $Z_1$ and $Z'_1$ with the following values:

$Z_1=10$ and $Z'_1=8$ when sub-carrier spacing $\mu=0$;
$Z_1=13$ and $Z'_1=11$ when sub-carrier spacing $\mu=1$;
$Z_1=25$ and $Z'_1=21$ when sub-carrier spacing $\mu=2$; and
$Z_1=43$ and $Z'_1=36$ when sub-carrier spacing $\rho=3$.

27. The UE of claim 22, wherein the second set of CSI computation delay requirement parameters include parameters $Z_1$ and $Z'_1$ with the following values:

$Z_1=22$ and $Z'_1=16$ when sub-carrier spacing $\mu=0$;
$Z_1=33$ and $Z'_1=30$ when sub-carrier spacing $\mu=1$;
$Z_1=44$ and $Z'_1=42$ when sub-carrier spacing $\mu=2$; and
$Z_1=97$ and $Z'_1=85$ when sub-carrier spacing $\mu=3$.

28. The UE of claim 22, wherein the third set of CSI computation delay requirement parameters include parameters $Z_3$ and $Z'_3$ with the following values:

$Z_3=22$ and $Z'_3=X_1$ when sub-carrier spacing $\mu=0$;
$Z_3=33$ and $Z'_3=X_2$ when sub-carrier spacing $\mu=1$;
$Z_3=\min(44, X_3+KB_1)$ and $Z'_3=X_3$ when sub-carrier spacing $\mu=2$; and
$Z_3=\min(97, X_4+KB_2)$ and $Z'_3=X_4$ when sub-carrier spacing $\mu=3$, wherein a UE beam report timing capability is represented by $X\mu$ and a UE beam switch timing capability is represented by KB.

29. The UE of claim 22, wherein the fourth set of CSI computation delay requirement parameters include parameters $Z_2$ and $Z'_2$ with the following values:

$Z_2=40$ and $Z'_2=37$ when sub-carrier spacing $\mu=0$;
$Z_2=72$ and $Z'_2=69$ when sub-carrier spacing $\mu=1$;
$Z_2=141$ and $Z'_2=140$ when sub-carrier spacing $\mu=2$; and
$Z_2=152$ and $Z'_2=140$ when sub-carrier spacing $\mu=3$.

30. A non-transitory computer-readable medium storing one or more instructions for wireless communication, the one or more instructions comprising:
one or more instructions that, when executed by one or more processors of a user equipment (UE), cause the one or more processors to:
receive a channel state information (CSI) reporting configuration for a CSI report, wherein the CSI reporting configuration indicates that the CSI report is to include a layer 1 signal to interference plus noise ratio (L1-SINR); and
determine a CSI computation delay requirement for processing the CSI report that is to include the L1-SINR, wherein the CSI computation delay requirement for processing the CSI report that is to include the L1-SINR is determined based at least in part on a first set of CSI computation delay requirement parameters, a second set of CSI computation delay requirement parameters, a third set of CSI computation delay requirement parameters, or a fourth set of CSI computation delay requirement parameters.

31. The non-transitory computer-readable medium of claim 30, wherein the CSI reporting configuration indicates that the CSI report is to include the L1-SINR by including, in the CSI reporting configuration, a report quantity information element that includes a value of 'ssb-Index-SINR' or 'cri-SINR'.

32. The non-transitory computer-readable medium of claim 30, wherein the CSI computation delay requirement for processing the CSI report that is to include the L1-SINR is determined based at least in part on a table that indicates associations between a set of sub-carrier spacings and a corresponding set of CSI computation delay requirement parameters.

33. The non-transitory computer-readable medium of claim 30, wherein the first set of CSI computation delay requirement parameters is a set of CSI computation delay requirement parameters used when CSI to be transmitted corresponds to wideband frequency-granularity where the CSI corresponds to at most four channel state information reference signal (CSI-RS) ports in a single resource without a CSI-RS resource indicator (CRI) report, and where a codebook type is set to 'typeI-SinglePanel' or where a report quantity is set to 'cri-RI-CQI';

wherein the second set of CSI computation delay requirement parameters is a set of CSI computation delay requirement parameters used when a report quantity is set to 'cri-RSRP' or 'ssb-Index-RSRP';

wherein the third set of CSI computation delay requirement parameters is a set of CSI computation delay requirement parameters used when a first condition associated with using the first set of CSI computation delay requirement parameters is not satisfied and when a second condition associated with using the second set of CSI computation delay requirement parameters is not satisfied; and wherein the fourth set of CSI computation delay requirement parameters is a set of CSI computation delay requirement parameters used when the first condition associated with using the first set of CSI computation delay requirement parameters is not satisfied, the second condition associated with using the second set of CSI computation delay requirement parameters is not satisfied, and a third condition associated with using the third set of CSI computation delay requirement parameters is not satisfied.

34. An apparatus for wireless communication, comprising:

means for receiving a channel state information (CSI) reporting configuration for a CSI report, wherein the CSI reporting configuration indicates that the CSI report is to include a layer 1 signal to interference plus noise ratio (L1-SINR); and means for determining a CSI computation delay requirement for processing the CSI report that is to include the L1-SINR, wherein the CSI computation delay requirement for processing the CSI report that is to include the L1-SINR is determined based at least in part on a first set of CSI computation delay requirement parameters, a second set of CSI computation delay requirement parameters, a third set of CSI computation delay requirement parameters, or a fourth set of CSI computation delay requirement parameters.

35. The apparatus of claim 34, wherein the CSI reporting configuration indicates that the CSI report is to include the L1-SINR by including, in the CSI reporting configuration, a report quantity information element that includes a value of 'ssb-Index-SINR' or 'cri-SINR'.

36. The apparatus of claim 34, wherein the CSI computation delay requirement for processing the CSI report that is to include the L1-SINR is determined based at least in part on a table that indicates associations between a set of sub-carrier spacings and a corresponding set of CSI computation delay requirement parameters.

37. The apparatus of claim 34, wherein the first set of CSI computation delay requirement parameters is a set of CSI computation delay requirement parameters used when CSI to be transmitted corresponds to wideband frequency-granularity where the CSI corresponds to at most four channel state information reference signal (CSI-RS) ports in a single resource without a CSI-RS resource indicator (CRI) report, and where a codebook type is set to 'typeI-SinglePanel' or where a report quantity is set to 'cri-RI-CQI';

wherein the second set of CSI computation delay requirement parameters is a set of CSI computation delay requirement parameters used when a report quantity is set to 'cri-RSRP' or 'ssb-Index-RSRP';

wherein the third set of CSI computation delay requirement parameters is a set of CSI computation delay requirement parameters used when a first condition associated with using the first set of CSI computation delay requirement parameters is not satisfied and when a second condition associated with using the second set of CSI computation delay requirement parameters is not satisfied; and wherein the fourth set of CSI computation delay requirement parameters is a set of CSI computation delay requirement parameters used when the first condition associated with using the first set of CSI computation delay requirement parameters is not satisfied, the second condition associated with using the second set of CSI computation delay requirement parameters is not satisfied, and a third condition associated with using the third set of CSI computation delay requirement parameters is not satisfied.

\* \* \* \* \*